Patented Oct. 7, 1941

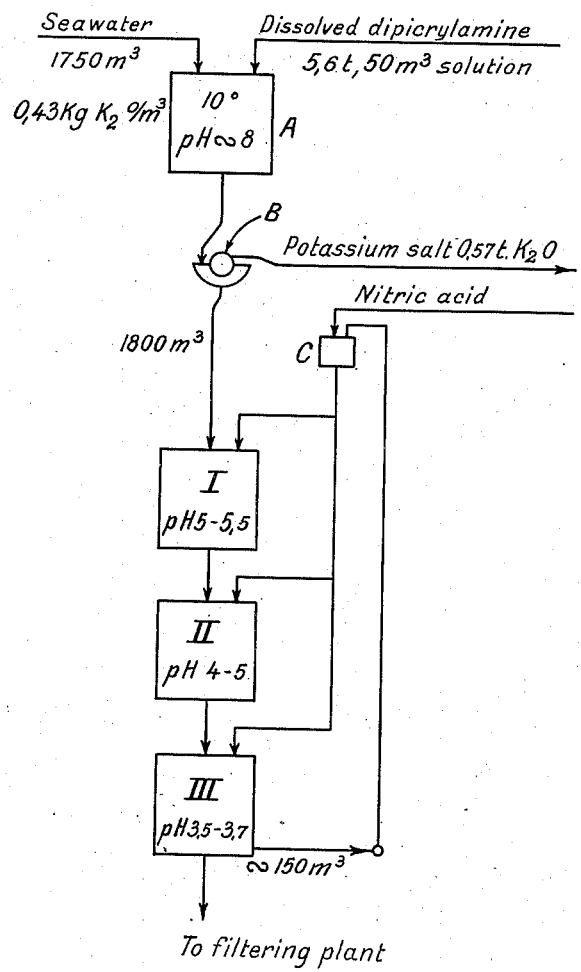

2,258,381

UNITED STATES PATENT OFFICE 2,258,381

PROCESS FOR THE RECOVERY OF POTASSIUM SALTS FROM SOLUTIONS

Wilhelm Fleischer and Jacob Kielland, Porsgrunn, Norway, assignors to Norsk Hydro-Elektrisk Kvaelstofaktieselskab, Oslo, Norway Application July 21, 1939, Serial No. 285,794
In Norway July 29, 1938

8 Claims. (Cl. 23—102)

The present invention relates to a novel method for the recovery of potassium salts from solutions, particularly solutions with a relative small content of potassium, such for example as sea water, salt lakes, mother liquors, etc. A characteristic feature of the invention is the employment, for this purpose, of dipicrylaminates, advantage being taken of the solubility relationships of the latter.

It is known that, for example, the potassium rubidium, and cesium salts of dipicrylamine (hexanitrodiphenylamine) are practically insoluble in water, while other dipicrylamine salts (dipicrylaminates) such as those of sodium, lithium, magnesium and calcium are readily soluble in water.

The invention is based upon the recognition that the aforementioned solubility characteristics of the dipicrylaminates may be utilized, without noteworthy consumption of dipicrylamine, for the recovery on a commercial scale of potassium salts from salt solutions, such as sea water, wherein the content of potassium is very small.

The possibility of the technical realisation of the process of the present invention is based, among other things, upon the discovery that the practically water-insoluble potassium dipicrylaminate may be brought to react directly with an acid, such, for example, as nitric acid, sulphuric acid or hydrochloric acid, in such manner that the potassium, combined with the acid, goes into solution, while insoluble dipicrylamine remains in the form of substantially unaltered crystals.

While the process of the present invention is applicable to a number of different salt solutions which contain potassium, it is of particular advantage for the treatment of sea water due to the fact that all the metals, except potassium, which are present in the form of dissolved salts in the sea water, form readily soluble compounds with dipicrylamine.

In order to recover potassium salts from salt solutions, in accordance with the invention, there is added to the salt solution a solution of a readily soluble dipicrylamine salt, e. g. calcium dipicrylaminate, whereby the potassium dipicrylaminate is precipitated as a crystalline mass which can be separated from the solution by filtration, decantation, or otherwise.

Instead of the calcium dipicrylaminate, use may also be made of the dipicrylaminates of sodium, lithium, or magnesium, but the calcium salt is preferred.

As to the quantity of dipicrylaminate to be used, it has been found advantageous to work without substantial excess or even with a slight deficiency of dipicrylaminate, calculated with reference to the total potassium content of the solution, e. g. sea water, to be treated.

After separating the precipitated crystalline mass, the solution is made acid by the addition of an acid whereby any excess of precipitant (e. g. calcium dipicrylaminate) is decomposed and insoluble dipicrylamine is precipitated, which can be recovered by filtration.

After filtration, the solution contains only traces of dipicrylamine.

The dipicrylamine may be precipitated by means of any suitable acid, preferably a readily available and inexpensive mineral acid, such as hydrochloric acid or the like.

It has been found advantageous to carry out this precipitation in separate stages in order to obtain crystals suitable for filtration, and the preferred method of carrying out the said precipitation will be described below:

The filtered potassium dipicrylaminate is decomposed with the aid of an acid which corresponds to the potassium salt to be prepared, e. g. nitric acid, sulphuric acid or hydrochloric acid, whereby potassium nitrate, potassium sulphate or potassium chloride is formed, while free dipicrylamine separates out.

In carrying out the said decomposition by means of acid it has been found that in order to obtain the most satisfactory results certain degrees of concentration and certain temperatures must be used, said degrees of concentration and temperatures being different in the case of different acids.

Thus when the decomposition is carried out by means of nitric acid good results are obtained when the concentration of the acid does not exceed 20% and the temperature does not exceed 30° C. In the interval of concentration between 20% and 40% of nitric acid as well as in the temperature interval between 30° C. and 80° C. the results are not satisfactory but good results are again obtained with concentrations of 40–50% and temperatures above 80° C.

It is also possible to carry out the decomposition with a nitric acid of a concentration above 40% at low temperature in which case, however, the mixture should be heated afterwards in order to dissolve the potassium salt or otherwise the mixture may be diluted sufficiently to cause solution of the potassium salt crystals.

If sulphuric or hydrochloric acid is used for the decomposition it has been found necessary or at least preferable to use comparatively high acid concentrations and comparatively high temperatures in order to avoid precipitation of the potassium salt formed.

It has further been found that the decomposition may easily take place by means of organic acids such as acetic acid, in which case there is obtained a solution of potassium acetate.

Further the decomposition may also take place by means of carbon dioxide ($CO_2$) under pressure in which case carbonate of potassium is produced.

After the decomposition has taken place so as to obtain a dissolved potassium salt the solution is filtered and the potassium salt recovered in known manner, while the dipicrylamine separated out during the two aforementioned acid treatments is converted by means of milk of lime into calcium dipicrylaminate which is again used for the further precipitation of potassium dipicrylaminate from the potassium-containing salt solution to be treated.

It has been established experimentally that it is possible in this way to recover more than 70% of the potassium present in sea water.

The following illustrative example shows how the process may be carried out for the production of potassium nitrate:

420 g. of dipicrylamine, $HN(C_6H_2(NO_2)_3)_2$, dissolved in 8 liters of milk of lime with a content of 27 g. of CaO, were added, after preliminary filtration of the said solution, to 100 liters of sea water containing about 73 g. of KCl, while stirring, at 16–18° C. A red crystalline mass separated out, and this was filtered after 15 minutes and then washed with water. The filter cake weighed 435 g., of which 78% was potassium dipicrylaminate, $KN(C_6H_2(NO_2)_3)_2$. The balance was water.

This filter cake was then treated while stirring at 20° C. with 270 cc. of 14% nitric acid for about ¾ hour, whereupon the crystalline mass turned orange-yellow, having been converted by reaction with the nitric acid without noteworthy alteration of the crystalline structure, into dipicrylamine, while the potassium content of the crystals went into solution as nitrate. Finally the mass was filtered and washed.

The quantity of potassium nitrate in the solution (the filtrate) corresponded to a conversion of 93% of the used nitric acid. With a systematic treatment of the salt with nitric acid, practically complete conversion can be obtained.

To the first filtrate of 108 liters, containing unconverted calcium dipicrylaminate, there was added such a quantity of 47% nitric acid that a pH of 3.6 was obtained. This caused precipitation of the dipicrylaminate.

Results corresponding to those given in the foregoing example were also obtained with other salt solutions containing potassium, e. g. with a salt solution of a composition corresponding to that of the water in the Dead Sea.

As mentioned above, the precipitation of dipicrylamine from the solution, resulting after the recovery of the potassium salts, should preferably be carried out in separate stages in order to obtain a comparatively coarse crystalline precipitation which lends itself easily to filtration.

To the slightly alkaline solution obtained after the precipitation of potassium dipicrylaminate there is added, in accordance with this feature of the invention, a dilute acid in consecutive steps in such a manner that the solution, for a certain period after each step, has a predetermined degree of acidity and a predetermined concentration of dipicrylamine dissolved.

Thereby it is possible to control the formation of crystals and the velocity of precipitation in such a manner that comparatively large crystals are obtained. The degree of acidity at the last step lies approximately at pH 3–4. It has been found that propitious conditions of precipitation are achieved when pH is changed approximately one unit or less for each step, after precipitation has commenced.

The dilution of the acid to be used for the precipitation is preferably carried out by means of suspension or filtrate from a previous process of precipitation.

In the following an example will be given with reference to the diagrammatical drawing of how the process may be carried out for obtaining 5,000 tons $K_2O$ per year from sea water using dipicrylamine as precipitant and three stages in the process of recovering the precipitation agent.

*Example*

1750 cu. m. sea water, containing 0.43 kg. $K_2O$ per cu. m. are pumped per hour into a tank (A), to which there are added per hour 50 cu. m. of a solution of calcium dipicrylaminate, containing 5.6 tons of dissolved dipicrylamine. Approximately 75% of the $K_2O$ contents are precipitated, corresponding to 0.57 ton $K_2O$ per hour. The precipitate is separated on filter B and is removed for the production of potassium salt. To the filtrate, approximately 1800 cu. m., there are added 300 kg. nitric acid, diluted in approximately 150 cu. m. return filtrate, or return suspension (C). Of this amount of dilute nitric acid there are used in the first stage (I) approximately 100 cu. m., whereby there is obtained a pH of approximately 5.5. The liquid remains at this stage for approximately ten minutes.

The liquid is conveyed to the second stage (II) in which further approximately 20 cu. m. of the acid return liquid are added, whereby there is obtained in this stage a pH of approximately 4.5–5.0. Even in this stage the liquid remains for approximately ten minutes. In the third stage (III) the rest of the acid return liquid, approximately 30 cu. m. is added, whereby a pH of approximately 3.5 is arrived at. After ten minutes the liquid is conveyed to the filtering plant, in which approximately 300 kg. dipicrylamine are recovered per hour.

The stepwise precipitation here described results in a decided improvement of the velocity of filtration. 50 liters suspension, precipitated in three stages in accordance with the stepwise method specified, passed through a filtering surface of 1 dm.² at a suction of 500 mm. Hg in half an hour, whereas a corresponding amount when precipitated in one stage needed two hours and a half.

By the use of a pressure filter working at 8 kg. per sq. cm. a still greater improvement was achieved, the filtering times being 3½ minutes and 45 minutes respectively.

When it is mentioned above that nitric acid is added in order to make the solution acid, it should be understood that any acid giving the necessary degree of acidity may be used, provided it is sufficiently cheap, it being not feasible to recover this acid. Further, the term stepwise precipitation is not to be taken in its strict sense, as the process may well be carried out with a continuous current of liquor through the apparatuses, provided the time period in each stage is sufficiently long. It is even possible to use a precipitation tank or channel with a continuous current of liquid, adding the acid at suitable consecutive places along the current.

In the case of hydrochloric acid it has been found advantageous to use a concentration of not less than 30% whereas in the case of sulphuric acid it is recommended to use a concentration of approximately 60% or more.

In both cases a considerable excess of acid is used.

Thus for instance 100 g. potassium dipicrylaminate precipitated from sea water is made to react with 100 cc. of hydrochloric acid 36%, and after stirring for one hour at 20° C. a conversion of 98% is obtained. A corresponding process with 79% sulphuric acid results in a conversion of 99% of the potassium dipicrylaminate in ½ hour.

If higher temperatures and longer reaction periods are employed satisfactory results may also be obtained in the case of hydrochloric acid with a concentration of approximately 10%.

We claim:

1. A process for the recovery of potassium salts from an aqueous saline solution with a potassium content of the order of the potassium content of sea water and the like, comprising the steps of adding a water-soluble dipicrylamine salt to the solution to precipitate the potassium in the form of water-insoluble potassium dipicrylaminate, separating the precipitate of potassium dipicrylaminate from the mother liquor, reacting the separated potassium dipicrylaminate with an acid to liberate dipicrylamine and to produce the potassium salt of the said acid in solution, and recovering non-converted dipicrylamine salt in the motor liquor in the form of free dipicrylamine by subjecting the mother liquor containing said non-converted salt to the action of an acid.

2. A process for recovery of potassium salts from an aqueous saline solution with a potassium content of the order of the potassium content of sea water and the like, comprising the steps of adding a water-soluble dipicrylamine salt to the solution to precipitate the potassium in the form of water-insoluble potassium dipicrylaminate, separating the precipitate of potassium dipicrylaminate from the mother liquor, reacting the separated potassium dipicrylaminate with an acid to liberate dipicrylamine and to produce the potassium salt of the said acid in solution, and recovering non-converted dipicrylamine salt in the motor liquor in the form of free dipicrylamine by subjecting said mother liquor to the action in separate consecutive steps of an acid.

3. A process for the recovery of potassium salts from an aqueous saline solution with a potassium content of the order of the potassium content of sea water and the like, comprising the steps of adding a water-soluble dipicrylamine salt to the solution to precipitate the potassium in the form of water-insoluble potassium dipicrylaminate, separating the precipitate of potassium dipicrylaminate from the mother liquor, reacting the separated potassium dipicrylaminate with an acid to liberate dipicrylamine and to produce the potassium salt of said acid in solution, and recovering non-converted dipicrylamine salt in the mother liquor in the form of free dipicrylamine by subjecting said mother liquor to the action in separate consecutive steps of a diluted acid.

4. A process for the recovery of potassium salts from an aqueous saline solution with a potassium content of the order of the potassium content of sea water and the like, comprising the steps of adding a water-soluble dipicrylamine salt to the solution to precipitate the potassium in the form of water-insoluble potassium dipicrylaminate, separating the precipitate of potassium dipicrylaminate from the mother liquor, reacting the separated potassium dipicrylaminate with an acid to liberate dipicrylamine and to produce the potassium salt of the said acid in solution, and recovering non-converted dipicrylamine salt in the mother liquor in the form of free dipicrylamine by subjecting said mother liquor to the action in separate consecutive steps of an acid diluted with solution from a previous process.

5. A process for the recovery of potassium salts from an aqueous saline solution with a potassium content of the order of the potassium content of sea water and the like, comprising the steps of adding a water-soluble dipicrylamine salt to the solution to precipitate the potassium in the form of water-insoluble potassium dipicrylaminate, separating the precipitate of potassium dipicrylaminate from the mother liquor, reacting the separated potassium dipicrylaminate with an acid to liberate dipicrylamine and to produce the potassium salt of the said acid in solution, and recovering non-converted dipicrylamine salt in the mother liquor in the form of free dipicrylamine by subjecting said mother liquor to the action in separate consecutive steps of an acid, the amount of acid added for each consecutive step being so determined as to increase the degree of acidity between the consecutive steps approximately one unit of pH.

6. A process for the recovery of potassium salts from an aqueous saline solution with a potassium content of the order of the potassium content of sea water and the like, comprising the steps of adding a water-soluble dipicrylamine salt to the solution to precipitate the potassium in the form of water-insoluble potassium dipicrylaminate, separating the precipitate of potassium dipicrylaminate from the mother liquor, reacting the separated potassium dipicrylaminate with an acid to liberate dipicrylamine and to produce the potassium salt of the said acid in solution, and recovering non-converted dipicrylamine salt in the mother liquor in the form of free dipicrylamine by subjecting said mother liquor to the action of diluted nitric acid in three consecutive stages, the amount of acid added at each stage being so determined as to cause an increase in the degree of acidity of approximately one unit pH for each consecutive stage, the solution remaining in each stage for a period of approximately ten minutes.

7. A method of treating aqueous saline solutions containing potassium salts which comprises the steps of isolating the potassium as potassium dipicrylaminate and reacting the latter with nitric acid of a concentration below 20% and at a temperature below 30° C. whereby the potassium of the dipicrylaminate goes into solution as nitrate of potassium while dipicrylamine remains in crystalline form.

8. A method of treating aqueous saline solutions containing potassium salts, which comprises the steps of isolating the potassium as potassium dipicrylaminate and reacting the latter with nitric acid of a concentration below 20% whereby the potassium of the dipicrylaminate goes into solution as nitrate of potassium while dipicrylaminate remains in crystalline form.

JACOB KIELLAND.
WILHELM FLEISCHER.